United States Patent
Johnson

(10) Patent No.: US 9,746,113 B2
(45) Date of Patent: Aug. 29, 2017

(54) BLADDER AND COUPLED PNEUMATIC COUPLING SYSTEM

(71) Applicant: Gregory Mark Johnson, Minneapolis, MN (US)

(72) Inventor: Gregory Mark Johnson, Minneapolis, MN (US)

( * ) Notice: Subject to any disclaimer, the term of this patent is extended or adjusted under 35 U.S.C. 154(b) by 0 days.

(21) Appl. No.: 15/250,872

(22) Filed: Aug. 29, 2016

(65) Prior Publication Data

US 2017/0023161 A1  Jan. 26, 2017

Related U.S. Application Data

(63) Continuation-in-part of application No. 13/469,430, filed on May 11, 2012, now Pat. No. 9,429,260.

(51) Int. Cl.
*F16L 17/02* (2006.01)
*F16L 29/02* (2006.01)

(52) U.S. Cl.
CPC .............. *F16L 29/02* (2013.01); *F16L 17/02* (2013.01); *Y10T 137/0402* (2015.04); *Y10T 137/9029* (2015.04)

(58) Field of Classification Search
CPC ......... F16L 17/02; F16L 17/03; F16L 17/025; F16L 17/00; F16L 17/035; F16L 29/00; F16L 29/02; Y10T 137/9029; Y10T 137/0402; A61M 16/0463; A61M 25/002; A61M 29/00
USPC ........... 251/152, 148, 150; 285/109, 97, 100
See application file for complete search history.

(56) References Cited

U.S. PATENT DOCUMENTS

| | | | | |
|---|---|---|---|---|
| 3,023,995 A | * | 3/1962 | Hopkins | F16L 17/10 192/85.13 |
| 3,033,594 A | * | 5/1962 | Cushman | F16L 37/06 277/605 |
| 3,222,076 A | * | 12/1965 | Hollingsworth | F16L 17/10 277/605 |
| 3,363,912 A | * | 1/1968 | Holloway | F16L 17/025 277/607 |
| 3,695,637 A | * | 10/1972 | Satterthwaite | F16L 27/1021 285/145.2 |
| 3,722,556 A | * | 3/1973 | Jeffers | B61G 5/08 105/358 |
| 4,276,945 A | * | 7/1981 | Ward, Sr. | E21B 21/08 175/209 |

(Continued)

*Primary Examiner* — John K Fristoe, Jr.
*Assistant Examiner* — Andrew J Rost

(57) ABSTRACT

Disclosed herein is a bladder that may be configured as a supply bladder and as a discharge bladder in a fluid coupler. The bladder may comprise at least one overtube having a lumen in which is positioned a catheter, which may include a fluid passage portion and an inflation portion, wherein the overtube has a first securing edge and a second securing edge, at least one gland nut to be secured to the first securing edge of the overtube, the gland unit may be tightened internally to the first securing edge of the overtube, a cord grip located with the gland unit when the gland nut is secured to the first secured edge, at least one sealing coupler ring to be secured to the second securing edge of the overtube, at least one bladder insert for creating a seal between the overtube and the sealing coupler ring within the catheter, and a plurality of O-rings to be secured inside the sealing coupler ring with a screw unit.

20 Claims, 8 Drawing Sheets

(56) References Cited

U.S. PATENT DOCUMENTS

| | | | | |
|---|---|---|---|---|
| 4,373,377 A | * | 2/1983 | Smith | F16J 15/46 |
| | | | | 285/97 |
| 4,786,087 A | * | 11/1988 | Thewlis | F16L 37/62 |
| | | | | 285/288.7 |
| 5,247,974 A | * | 9/1993 | Sargent | B60R 15/00 |
| | | | | 137/899 |
| 8,544,894 B1 | * | 10/2013 | Borba | E03F 1/008 |
| | | | | 141/287 |

* cited by examiner

BLADDER AND COUPLED PNEUMATIC COUPLING SYSTEM

CROSS-REFERENCE TO RELATED APPLICATIONS

This application is a continuation in part (CIP) of U.S. patent application Ser. No. 13/469,430, filed on May 11, 2012; the contents of which are hereby incorporated by reference.

BACKGROUND

Field

This invention is generally related to a bladder and to a fluid coupling system.

Background

Fluid pressure, such as but not limited to, pneumatic pressure, is often used for various applications, including as a motive force for a tool, such as a nail gun. The fluid pressure is often generated by a compressor and passed through a conduit system. The conduit system may include conduit, such as hosing and tubing, and various fittings for controlling the flow of the fluid through the conduit system. It is generally beneficial to have a means for quickly connecting and disconnecting the conduit, while minimizing the leakage of fluid through the conduit system, and while maintaining an optimal and efficient flow of fluid through the conduit system. However, the current conduit systems, due to the limitations of the current fluid coupling systems, fail to provide an optimum system for quickly connecting and disconnecting the conduit, while minimizing the leakage of fluid through the conduit system, and while maintaining an optimal and efficient flow of fluid through the conduit system. Therefore, there is a need for a more efficient bladder and a fluid coupling systems

SUMMARY

Disclosed herein is a new bladder. In accordance with one aspect of the invention, the bladder is configured to be used as a supply bladder and as a discharge bladder in a fluid coupler. The bladder includes an overtube having a lumen in which is positioned a catheter, which includes a fluid passage portion and an inflation portion, wherein the overtube has a first screwing edge and a second screwing edge, a gland nut to be screwed to the first screwing edge of the overtube, a gland unit to be tightened internally to the first screwing edge of the overtube, a cord grip located with the gland unit when the gland nut is screwed to the first screwing, a sealing coupler ring to be screwed to the second screwing edge of the overtube, a bladder insert for creating a seal between the overtube and the sealing coupler ring within the catheter, and a couple of O-rings to be secured inside the sealing coupler ring with a screw unit.

The fluid coupling system includes a supply bladder and a discharge bladder, an inflation portion of the supply bladder that is a supplier partially enclosed within a supply housing, the supply housing having a supply inflation passage that provides fluid communication between a fluid passage and the supply inflation portion, and the inflation portion of the discharge bladder is a discharger partially enclosed within a discharge housing, a flow controller, and wherein the discharge inflation portion may be isolated from the fluid passage in a first housing position and be placed in fluid communication with the fluid passage in a second housing position by twisting the supply housing in relation to the discharge housing to the second housing position, and wherein the flow controller may block the fluid passage while in a first controller position and may open a fluid passage through the supply housing and the discharge housing while in a second controller position.

One of the advantages of the present invention is the ability to seal hoses inside bladders and connect two hoses together. Other advantages are provided in the disclosure.

Other bladders, systems, aspects, features, embodiments and advantages of the fluid coupling system will be, or will become, apparent to one having ordinary skill in the art upon examination of the following drawings and detailed description. It is intended that all such additional bladders, systems, aspects, features, embodiments and advantages be included within this description, and be within the scope of the accompanying claims.

BRIEF DESCRIPTION OF THE DRAWINGS

It is to be understood that the drawings are solely for purpose of illustration. Furthermore, the components in the figures are not necessarily to scale, emphasis instead being placed upon illustrating the principles of the system disclosed herein. In the figures, like reference numerals designate corresponding parts throughout the different views.

DETAILED DESCRIPTION

The following detailed description, which references to and incorporates the drawings, describes and illustrates one or more specific embodiments. These embodiments, offered not to limit but only to exemplify and teach, are shown and described in sufficient detail to enable those skilled in the art to practice what is claimed. Thus, for the sake of brevity, the description may omit certain information known to those of skill in the art.

Figure 1:
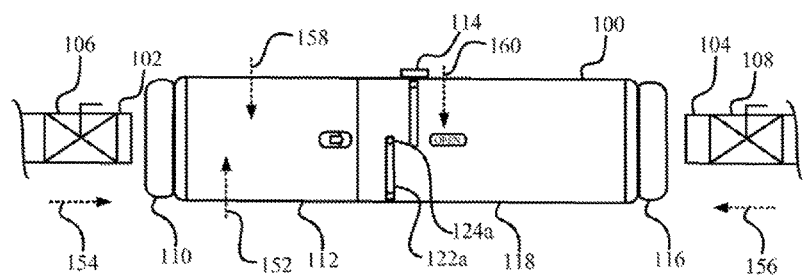
FIG. 1 is a front view of an exemplary fluid coupler between a supply conduit and a discharge conduit.

FIG. 1 shows a front view of an exemplary fluid coupler 100 between a supply conduit 102 and a discharge conduit 104. The supply conduit 102 may be connected to a supply valve 106. The supply valve 106 may be connected, either directly or through various fluid fittings (not shown) to a fluid pressure source (not shown), such as but not limited to, a compressor (not shown). Discharge conduit 104 may be connected to a discharge side valve 108. Discharge side valve 108 may be connected, either directly or through various fluid fitting (not shown) to a fluid pressurized tool (not shown), such as but not limited to, a nail gun (not shown).

Figure 5:
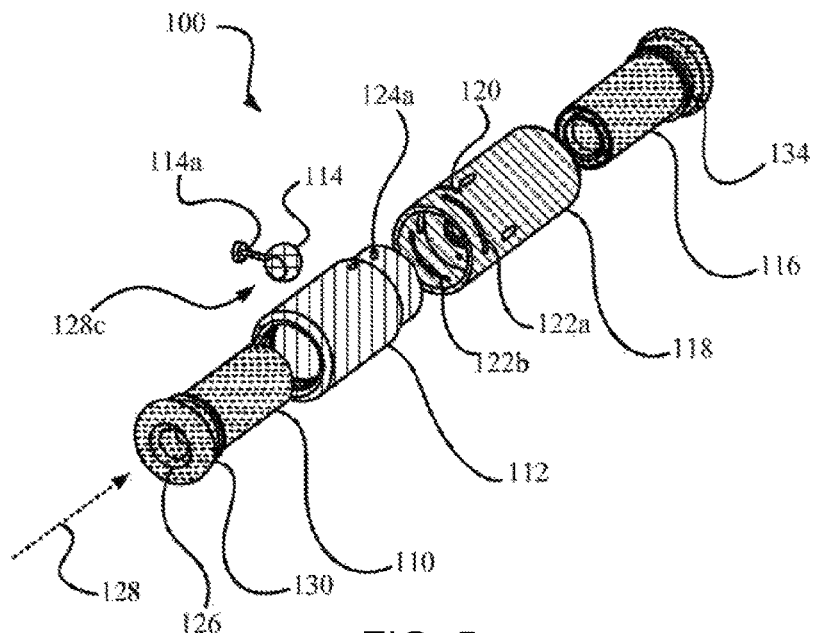
FIG. 5 is an exploded view of the fluid coupler of FIG. 1.

Coupler 100 may include a supply bladder 110, a supply housing 112, a valve 114 (a more complete view of valve 114 is shown in FIG. 5), which may be in the form of a ball, a discharge bladder 116, and a discharge housing 118. Discharge housing 118 may include a ball valve arm slot 120, a first housing alignment slot 122a and a second housing alignment slot 122b (see FIG. 2). Supply housing 112 may include a first alignment pin 124a and a second alignment pin 124b (see FIG. 2).

Figure 2:
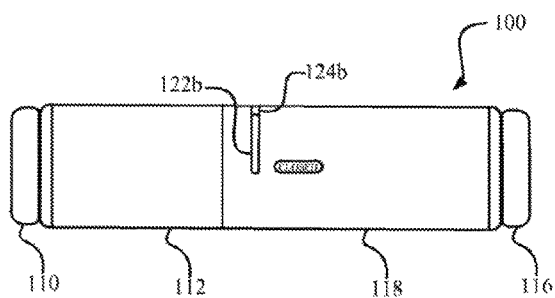
FIG. 2 is a rear view of the fluid coupler of FIG. 1.

FIG. 2 shows a rear view of fluid coupler 100 in a closed position.

Figure 3:
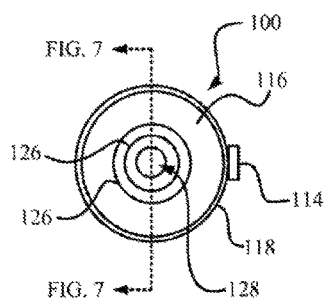
FIG. 3 is a discharge-side end-view of the fluid coupler of FIG. 1 with the orientation Of the coupler 100 as shown in FIG. 2

FIG. 3 shows a discharge-side end-view of the fluid coupler 100 with the orientation of coupler 100 as shown in FIG. 2 (i.e., with the front of coupler 100 on the right side of FIG. 3). As can be seen in FIG. 3, discharge bladder 116 may include a plurality of concentric ridges 126 surrounding a fluid passage 128 formed, in part, by discharge bladder 116. A plurality of concentric ridges 126 may also be provided on a supply bladder (not shown).

Figure 4:
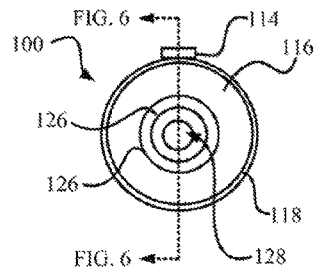
FIG. 4 is a discharge side end-view of the fluid coupler of FIG. 1 with the orientation of the coupler as shown in FIG. 1.

FIG. 4 shows a discharge side end view of fluid coupler 100 with the orientation of coupler 100 as shown in FIG. 1 (with the front of coupler 100 on the left side of FIG. 4).

FIG. 5 shows an exploded view of fluid coupler 100.

Figure 6:
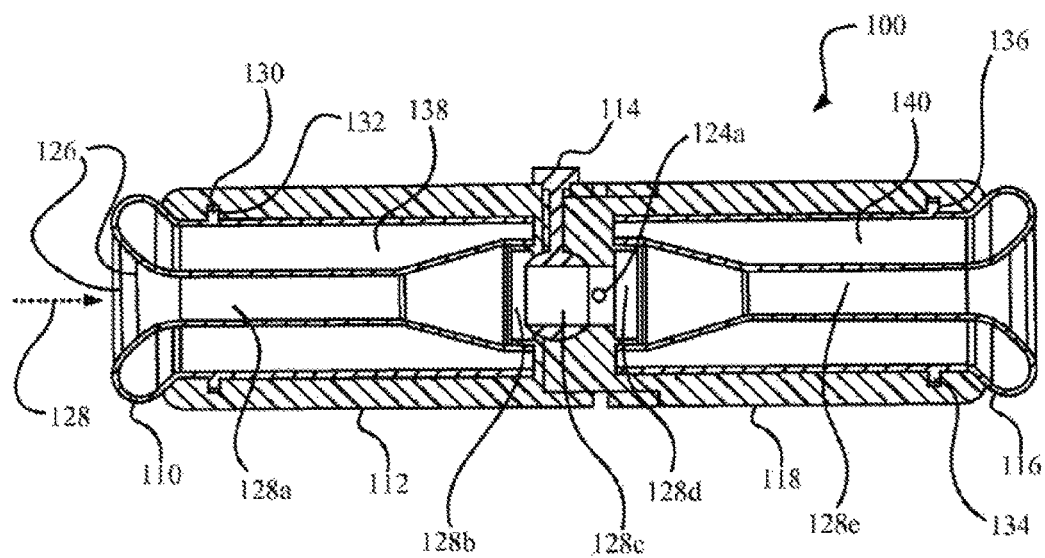
FIG. 6 is a cut-away view of the coupler of FIG. 1 from a section line as shown in FIG. 4.

FIG. 6 shows a cut-away view of coupler 100 from a section line as shown in FIG. 4. As can be seen in FIG. 6, fluid passage 128 runs throughout coupler 100 and is formed by fluid passage portion 128a of supply bladder 110, a fluid passage portion 128b of supply housing 112, a fluid passage portion 128c of valve 114, a fluid passage portion 128d of discharge housing 118, and a fluid passage portion 128e of discharge bladder 116.

Supply bladder 110 may include a supply shoulder ridge 130 that sits within a supply shoulder seat 132 portion of supply housing 112. Discharge bladder 116 may include a discharge shoulder ridge 134 that sits within a discharge shoulder seat 136 portion of discharge housing 118. Supply bladder 110 may include a supply inflation portion 138. Discharge bladder 116 may include a discharge inflation portion 140.

Figure 7:
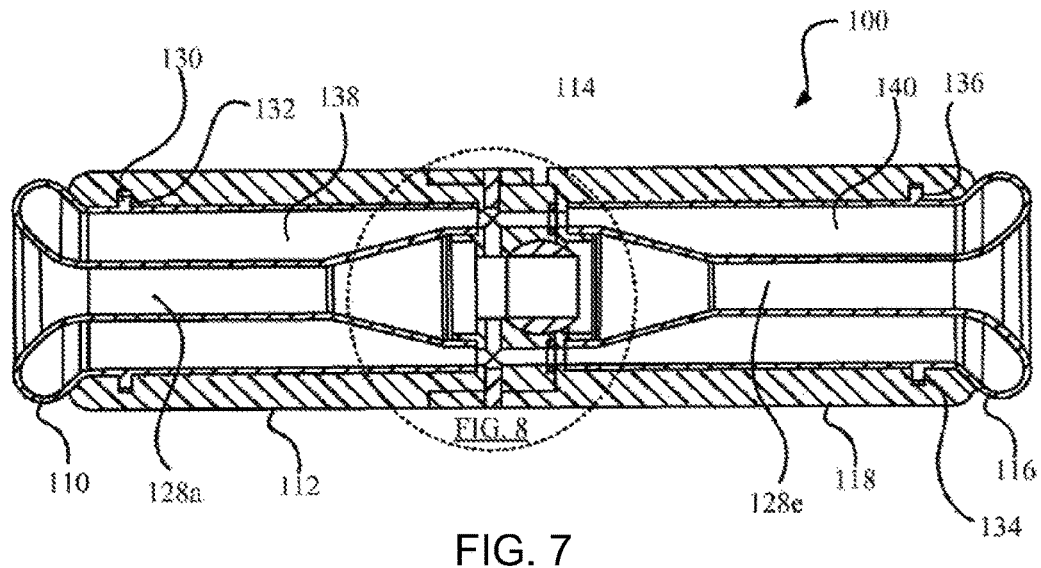
FIG. 7 shows a cut-away view of the coupler of FIG. 1 from a section line shown in FIG. 3.
Figure 8:
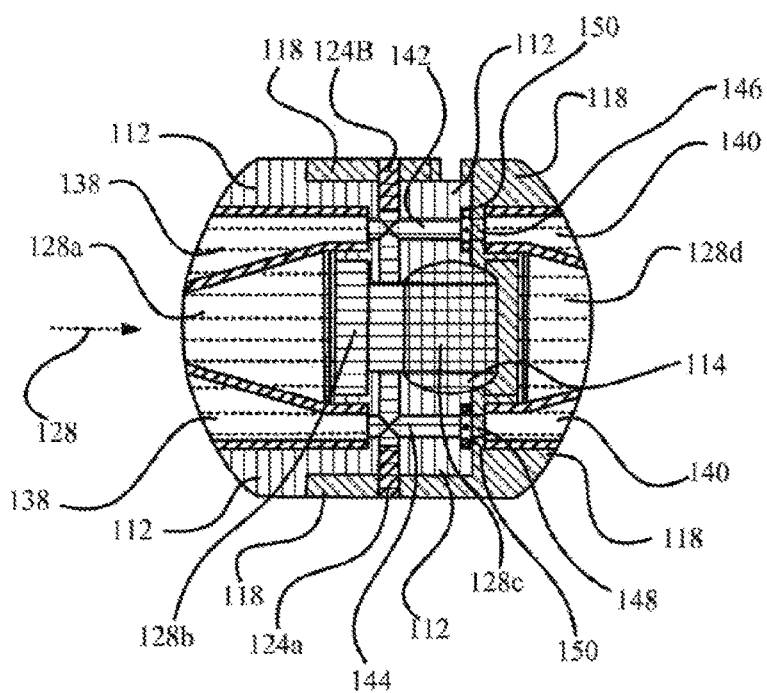
FIG. 8 shows an enlarged central portion of the cut-away view of the coupler of FIG. 7.

FIG. 7 shows a cut-away view of the coupler 100 from a section line as shown in FIG. 3. FIG. 8 shows an enlarged central portion of the cut-away view of coupler 100 of FIG. 7. FIG. 8 shows that supply housing 112 may include a front supply inflation passage 142 and a rear supply inflation passage 144, and discharge housing 118 may include a front discharge inflation passage 146 and a rear discharge inflation passage 148. Coupling 100 may also include O-rings 150.

In operation, coupler 100 may initially be placed in a closed position (as shown in FIG. 1) by twisting supply housing 112 in the direction of arrow 152 while discharge housing 118 remains stationary, and while maintaining valve 114 in a closed position (as shown in FIG. 1). Supply valve 106 may be closed while supply conduit 104 is moved in the direction of arrow 154 and pressed against supply bladder 110 near the plurality of concentric ridges 126. Opening supply valve 106 may then permit compressed fluid, for example but not limited to, compressed air to flow into supply inflation portion 138 of supply bladder 110 by passing through fluid passage portion 128a, fluid passage portion 128b, fluid passage portion 128c, front supply inflation passage 142, and rear supply inflation passage 144. Inflating supply inflation portion 138 may cause supply bladder 110 to seal and secure supply conduit 102 against supply bladder 110 near the plurality of concentric ridges 126. Initially, discharge inflation portion 140 of discharge bladder 116 may remain isolated from the compressed air due to the intended misalignment of front and rear discharge inflation passages 146, 148 from front supply inflation portion 142, and front and rear supply inflation passages 142, 144, respectively.

After supply conduit 102 is secured to supply bladder 110 by the inflation of supply inflation portion 138, discharge conduit 104 may be moved in the direction of arrow 156 and pressed against supply bladder 110 near the plurality of concentric ridges 126. Twisting supply 112 housing in the direction of arrow 158 while discharge housing 118 remains stationary may then cause front and rear discharge inflation passage 146 and 148 to align with front and rear supply inflation passage 142 and 144. The compressed air may then flow to discharge inflation portion 140 of discharge bladder 116. Inflating discharge inflation portion 140 may cause discharge bladder 116 to seal and secure discharge conduit 104 against discharge bladder 116 near the plurality of concentric ridges 126. Turning the stem 114a of valve 114 in the direction of arrow 160 may then complete the opening of the fluid passage 128 from supply conduit 102 to discharge conduit 104. As such two houses may be sealed inside bladders, and two houses may be coupled together in this way.

Figure 9:
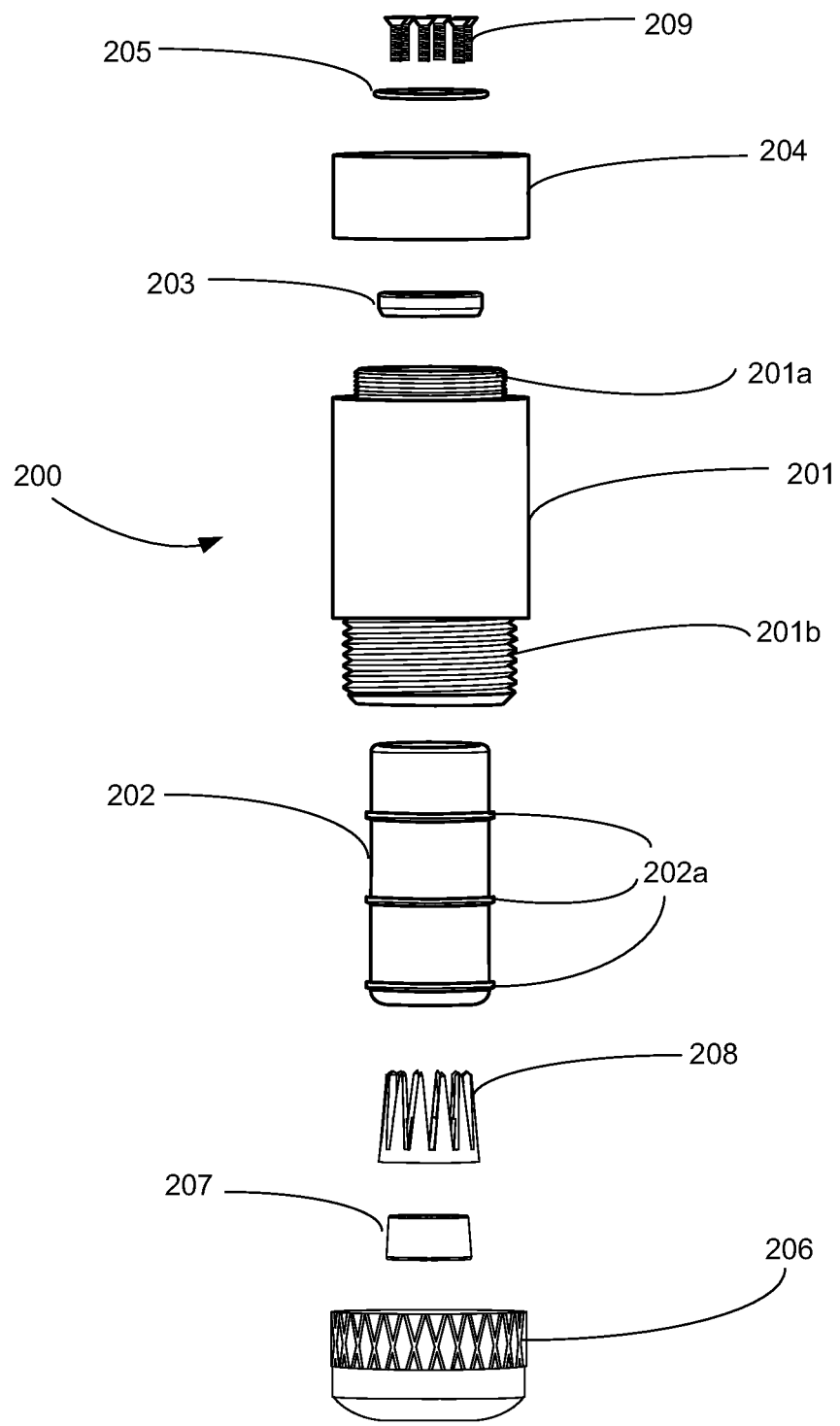
FIG. 9 is an exploded view of a bladder to be positioned in the fluid coupler

FIG. 9 is an exploded front view of exemplary bladder 200 that may be secured internally to supply housing 112 and discharge housing 118 of fluid coupler 100. As shown, bladder 200 may include an overtube 201, a catheter 202, a bladder insert 203, a sealing coupler ring 204, O-rings 205 which may include an inner component, an outer component, a gland nut 206, a gland 207, an internal cord grip 208, and a screw unit 209 that may include a plurality of screws. As shown, catheter 202 may include on the outer surface a plurality of circumferential ridges 202a.

Figure 10:
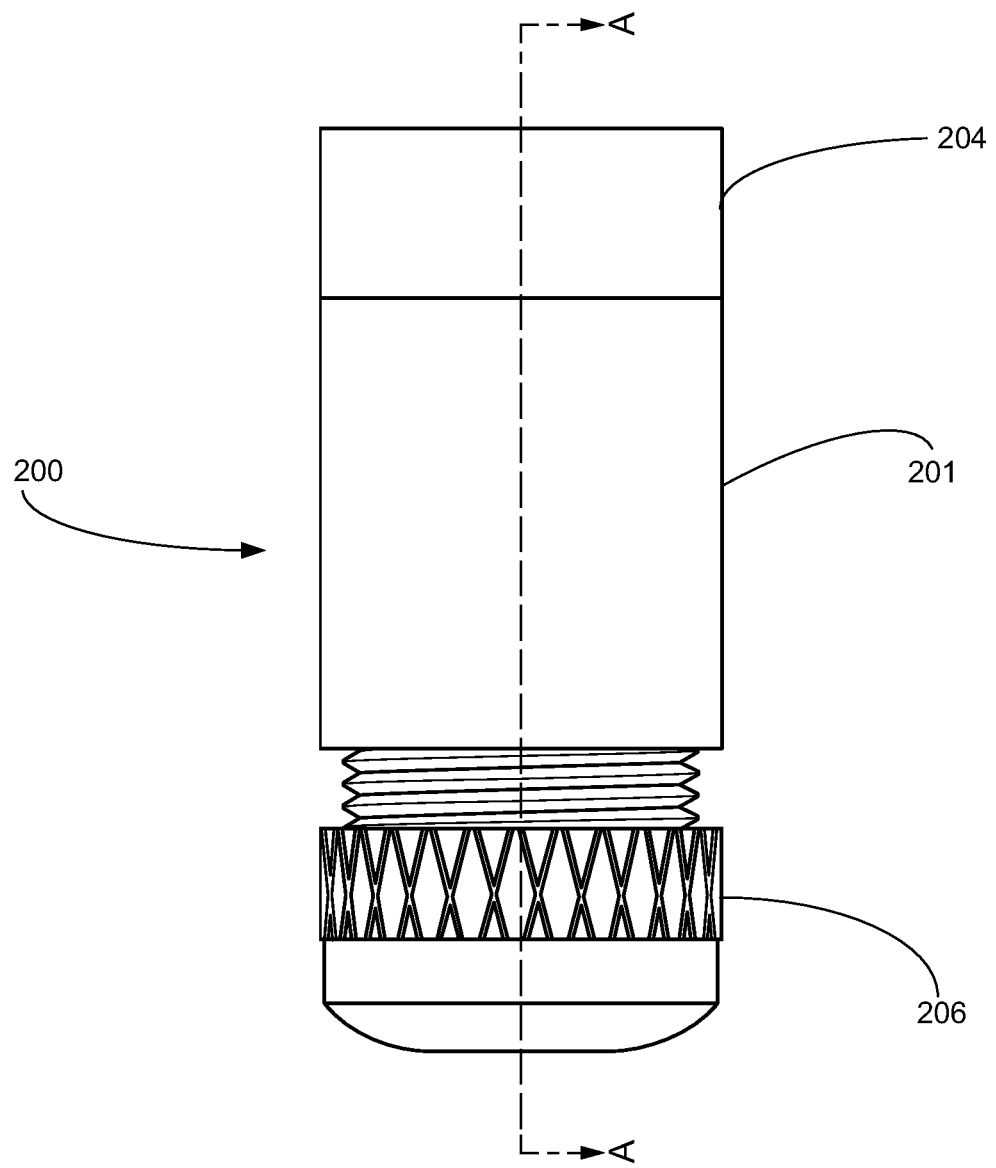
FIG. 10 shows a front view of the bladder of FIG. 9 with a gland nut not fully screwed to an overtube.

As shown in FIG. 10, the overtube 201 may be configured to be a hard external shell to securely maintain internal components, and may include two securing components 201a and 201b, shown in FIG. 9, which may be located at a proximal end and at a distal end, respectively, and may be configured to be secured to coupling ring 204 and to gland nut 206, respectively. Moreover as shown, coupler ring 204 may be fully tightened to overtube 201 whereas gland nut 206 is partially secured to securing component 201b. Accordingly, overtube 201 may be configured to securely retain together all components of bladder 200.

Figure 11:
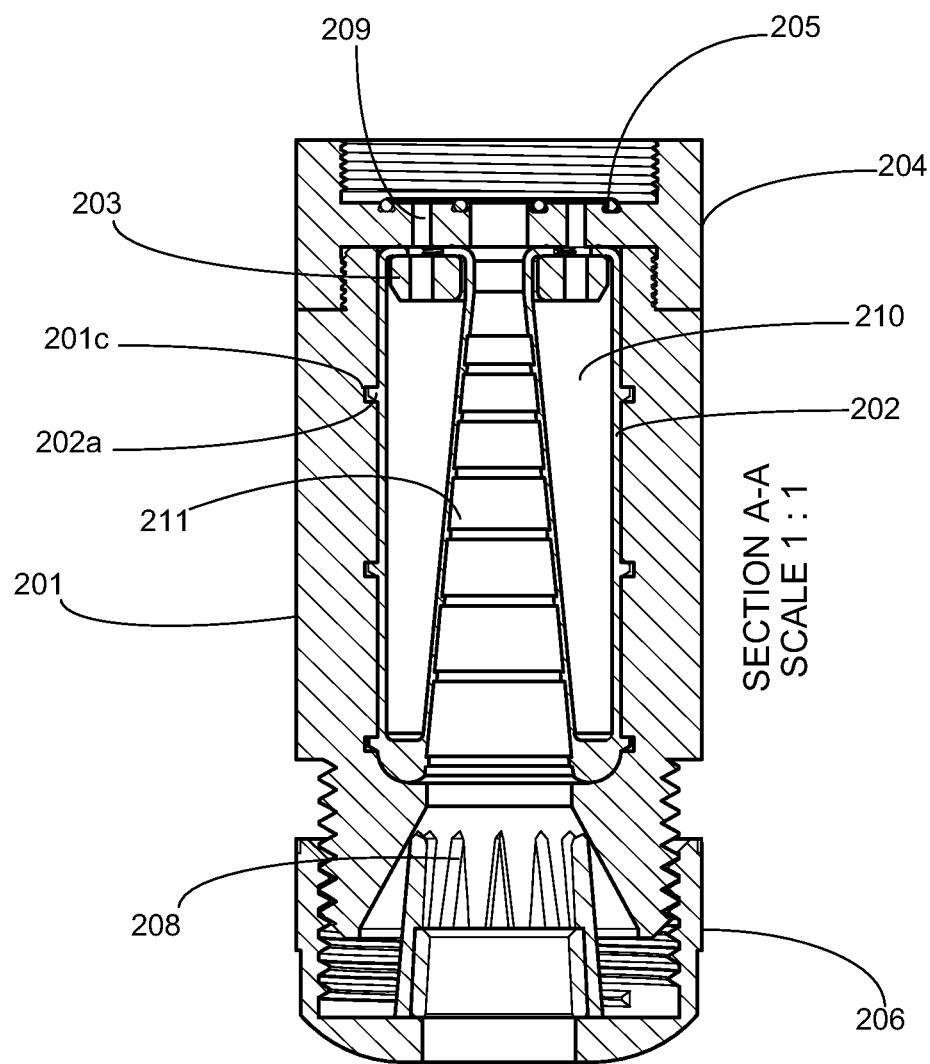
FIG. 11 is a cut-away view of the bladder of FIG. 9 from a section line AA as shown in FIG. 10.

FIG. 11 shows a cut-away view of bladder 200 from a section line AA shown in FIG. 10. As shown, bladder 200 may include catheter 202, a fluid passage portion 211, and an inflation portion 210. Moreover, as shown, when coupling ring 204 is fully secured to overtube 201, bladder insert 203 is positioned internally in a distal end of catheter 202, as well as the forward end portions of screw unit 209, and O-rings 205 may be tightened inside coupling ring 204 by screw unit 209. Catheter 202 may be configured to expand as a result of pressure to hold cable and create a seal on tubes and pipes. Additionally, when gland nut 206 is secured to overtube 201, the forward ends of cord grip 208 may be positioned internally in a near end of fluid passage portion 211 of the overtube 201.

As shown in FIG. 11, screw unit 209 may be configured to secure to bladder insert 203 to put compression on bladder 200 and create a seal.

Moreover as shown in FIG. 11, tube 201 may include in the inner surface a plurality of circumferential supply shoulder seats 201c connected to a plurality of circumferential ridges 202a of tube 202.

Figure 12:
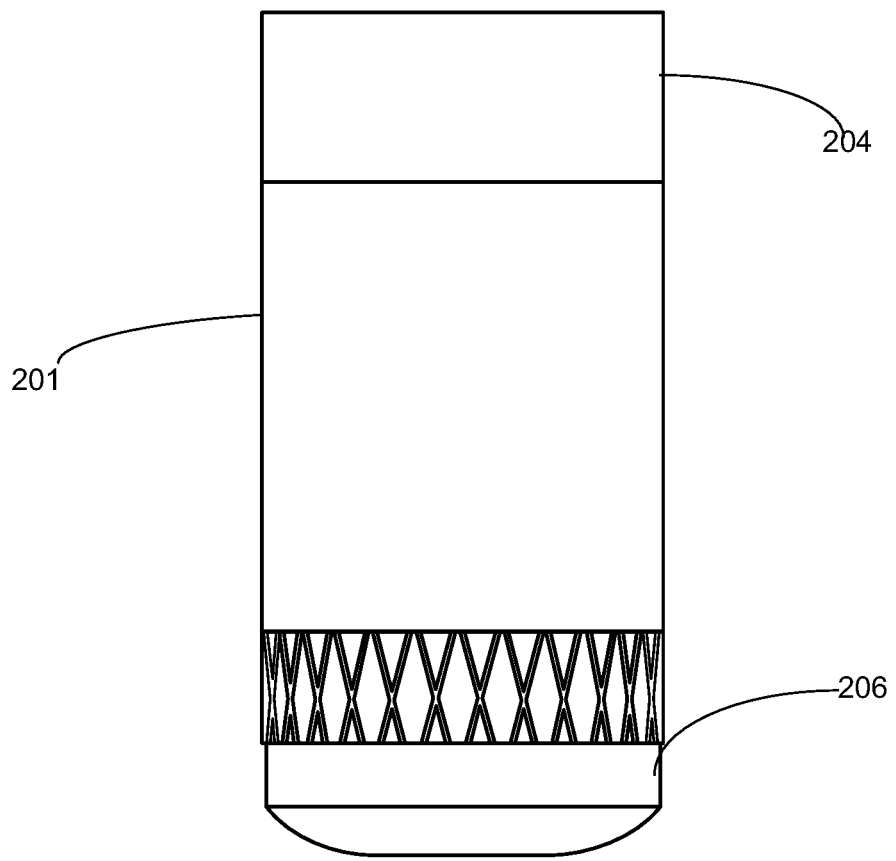
FIG. 12 shows a front view of the bladder of FIG. 9 with the gland nut fully screwed to the overtube.

FIG. 12 shows a front view of bladder 200 in a closed position, where unlike in FIG. 10 gland nut 206 may be fully secured to overtube 201. In this position, gland nut 206 is tightened onto overtube 201 compressing cord grip 208 to create an additional retaining seal on a supply pipe or a supply conduit to be secured to bladder 200. This tightening of gland nut 206 prevents the supply conduit from being disconnected when bladder 200 is expanded.

Figure 13:
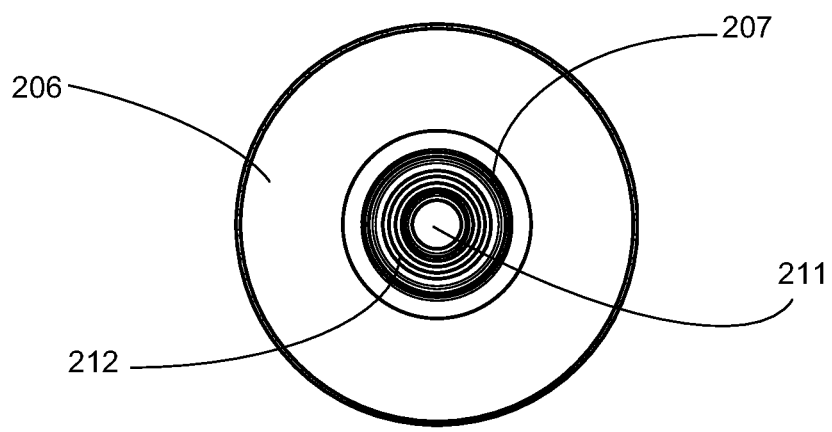
FIG. 13 shows a side end-view of the gland nut of the bladder of FIG. 9.

FIG. 13 shows an end view of gland nut 206 of bladder 200, which can be a discharge end or a supply end, with the orientation as shown in FIG. 12. As can be seen in FIG. 13, gland nut 206 may include a plurality of concentric ridges 212 surrounding a fluid passage 211. Plurality of concentric ridges 212 are useful when gland nut 206 is used as a discharge end or a supply end. Moreover, gland nut 207 may include an elastomer part that provides friction on a tube to help with retention of the tube.

Figure 14:
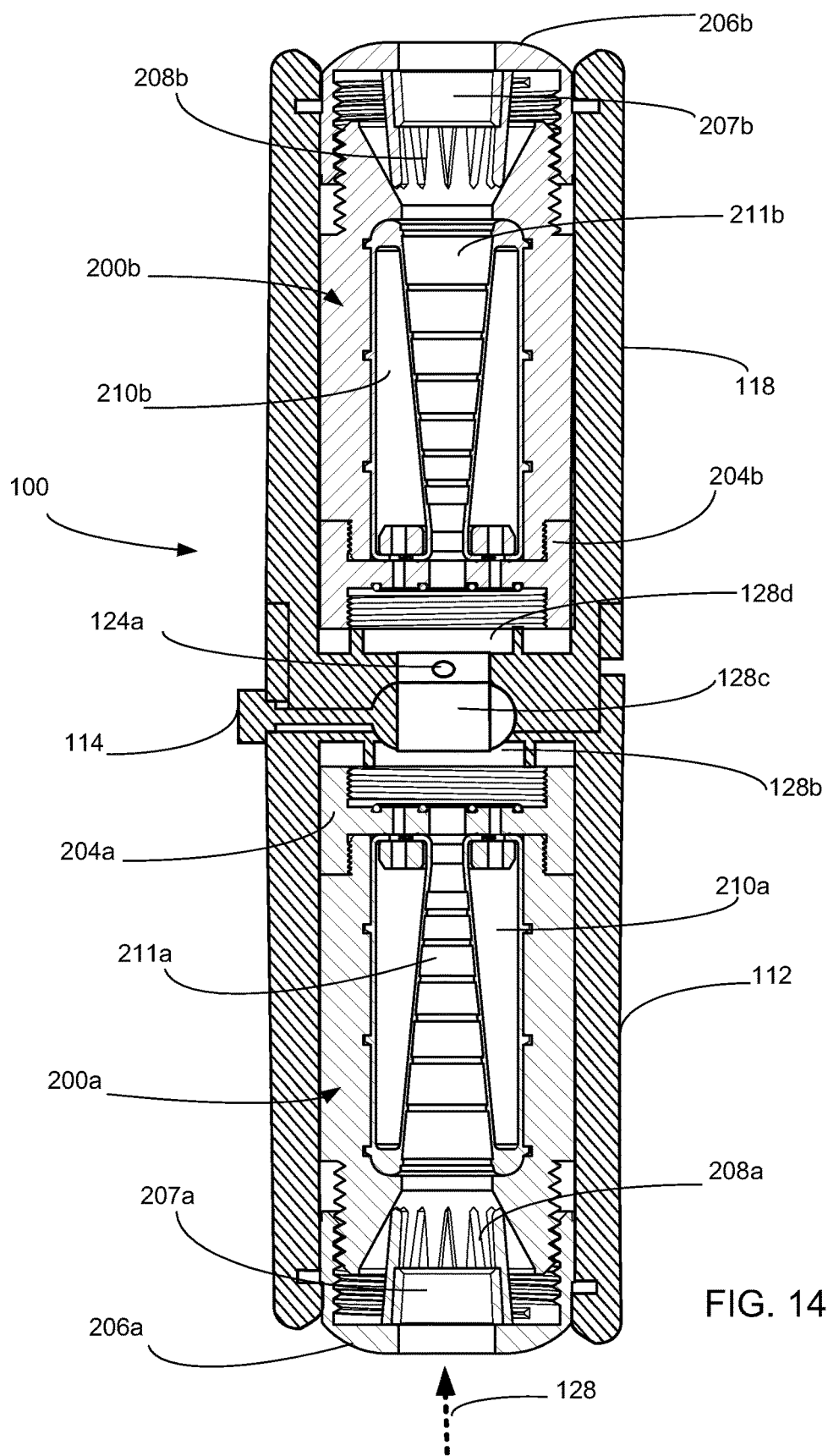
FIG. 14 shows a cut-away view of the coupler of FIG. 1 with a first bladder positioned inside the supply housing of the coupler and a second bladder positioned inside the discharge housing of the coupler.

FIG. 14 shows a cut-away view of coupler 100 from a section line that provides a similar cut-away view of the bladder 200 shown in FIG. 11. As can be seen in FIG. 14, coupler 100 may include internally two bladders 200a and 200b, where one of them may be used as supply bladder and the other one may be used as discharge bladder. As shown, a fluid passage 128 may run throughout coupler 100 and is formed by fluid passage portion 211a of the supply bladder 200a. As discussed previously for FIG. 6, coupler 100 may further include a fluid passage portion 128b of supply housing 112, a fluid passage portion 128c of valve 114, a fluid passage portion 128d of discharge housing 118, and a fluid passage portion 128e of discharge bladder 201b.

Before an operation and insertion of bladder 200 inside coupler 100, bladder insert 203 may be used to create a seal between overtube 201 and coupler ring 204. In addition to providing a bladder seal, coupler ring 204 is configured to provide a connection to valve 114. During this connection, O-rings 205 create a seal between coupler sing 204 and valve 114.

As shown in FIG. 14, cord grip 208 may be configured to bend and flex while inside overtube 201 to press against gland 207 and against a tube to retain tube 201 while connected to bladder 200.

Similarly as with supply bladder 110 and discharge bladder 116, inflating supply inflation portion 210a may cause supply bladder 200a to seal and secure a supply conduit against supply bladder 200a near plurality of concentric ridges 212. Initially, discharge inflation portion 210b of discharge bladder 200b may remain isolated from the compressed air due to the intended misalignment of front and rear discharge inflation passages of the coupler 100. The bladder 102 is a flexible reservoir that holds a fluid, such as water or other hydration products. As used herein, the term "fluid" means any substance that can be made to flow including, but is not limited to, liquids, gases, granular or powdered solids, mixtures or emulsions of two or more fluids, suspensions of solids within liquids or gases, etc. Non-limiting examples of fluids include water and air.

The word "exemplary" is used herein to mean "serving as an example, instance, or illustration." Any embodiment or variant described herein as "exemplary" is not necessarily to be construed as preferred or advantageous over other embodiments or variants. All of the embodiments and variants described in this description are exemplary embodiments and variants provided to enable persons skilled in the art to make and use the invention, and not necessarily to limit the scope of legal protection afforded the appended claims.

The above description of the disclosed embodiments is provided to enable any person skilled in the art to make or use that, which is defined by the appended claims. The following claims are not intended to be limited to the disclosed embodiments. Other embodiments and modifications will readily occur to those of ordinary skill in the art in view of these teachings. Therefore, the following claims are intended to cover all such embodiments and modifications when viewed in conjunction with the above specification and accompanying drawings.

What is claimed is:

1. A bladder configured as a supply and a discharge bladder in a fluid coupler, the bladder comprising:
    at least one overtube having a lumen in which is positioned a catheter, which includes a fluid passage portion and an inflation portion, wherein the overtube has a first securing edge and a second securing edge;
    a gland nut to be secured to the first securing edge of the overtube;
    a gland unit to be secured internally to the first securing edge of the overtube;
    a cord grip located with the gland unit when the gland nut is secured to the first securing edge;
    a sealing coupler ring to be secured to the second securing edge of the overtube;
    a bladder insert for creating a seal between the overtube and the sealing coupler ring within the catheter; and
    a plurality of rings to be secured inside the sealing coupler ring with a screw unit.

2. The bladder of claim 1, wherein the catheter includes on an outer surface having a plurality of circumferential rings connected to plurality of ridges disposed on the inner surface of the overtube.

3. The bladder of claim 1, wherein the catheter expands as a result of pressure to hold a cable and to create a seal on the cable.

4. The bladder of claim 1, wherein the sealing coupler ring is used to create a bladder seal and provides a connection to a valve of a fluid coupler in which the bladder is positioned.

5. The bladder of claim 4, wherein the plurality of O-rings create a seal between the sealing coupler ring and the valve of the fluid coupler.

6. The bladder of claim 1, wherein the gland nut compresses the cord grip, when secured to the overtube, to create an additional retaining seal on a first pipe, thereby preventing the first pipe from flying out as a result of an expansion of the bladder.

7. The bladder of claim 1, wherein the gland unit includes an elastomer part that provides friction on a tube to help with retention.

8. The bladder of claim 7, wherein the cord grip flexes and bends internally to the overtube to press against the gland unit to retain the tube.

9. The bladder of claim 1, wherein the screw unit screws into the bladder insert to put compression on the bladder and to create a seal.

10. A fluid coupling system comprising:

At least one supply bladder and at least one discharge bladder, each of which having an overtube having a lumen in which is positioned a catheter, which includes a fluid passage portion and an inflation portion, wherein the overtube has a first securing edge and a second securing edge, at least one gland nut to be screwed to the first screwing edge of the overtube, the gland unit to be tightened internally to the first securing edge of the overtube, a cord grip located with the gland unit when the gland nut is secured to the first securing edge, at least one sealing coupler ring to be secured to the second securing edge of the overtube, a bladder insert for creating a seal between the overtube and the sealing coupler ring within the catheter, and a plurality of O-rings to be secured inside the sealing coupler ring with a screw unit, wherein the inflation portion of the supply bladder is a supplier partially enclosed within a supply housing, the supply housing having a supply inflation passage that provides fluid communication between a fluid passage and the supply inflation portion, and the inflation portion of the discharge bladder is a discharger partially enclosed within a discharge housing;

a flow controller; and wherein the discharge inflation portion may be isolated from the fluid passage in a first housing position and be placed in fluid communication with the fluid passage in a second housing position by twisting the supply housing in relation to the discharge housing to the second housing position, and wherein the flow controller may block the fluid passage while in a first controller position and may open a fluid passage through the supply housing and the discharge housing while in a second controller position.

11. The system of claim 10, wherein the supply bladder is adapted to receive and seal a supply conduit at the supply gland nut.

12. The system of claim 11, wherein the discharge bladder is adapted to receive and seal a discharge conduit at the discharge bland nut.

13. The system of claim 11, wherein the discharge housing includes securely at least one valve.

14. The system of claim 13, wherein the supply conduit is fluidly communicating with the discharge conduit when the valve moves from the first position to the second position.

15. The system of claim 10, wherein the supply bladder is inflated and sealed inside the supply housing.

16. The system of claim 15, wherein the supply bladder is inflated using a fluid from the supply conduit.

17. The system of claim 10, wherein the discharge bladder is inflated and sealed inside the discharge housing.

18. The system of claim 17, wherein the discharge bladder is inflated using a fluid from the discharge conduit.

19. The system of claim 10, wherein the flow controller is secured in the discharge housing.

20. The system of claim 19, wherein the flow controller is opened by moving a stem of the flow controller from a first position to a second position.

* * * * *